Dec. 5, 1967   G. C. DYGERT ET AL   3,356,395
ADJUSTABLE CLAMP FITTING
Filed July 27, 1965   2 Sheets-Sheet 1
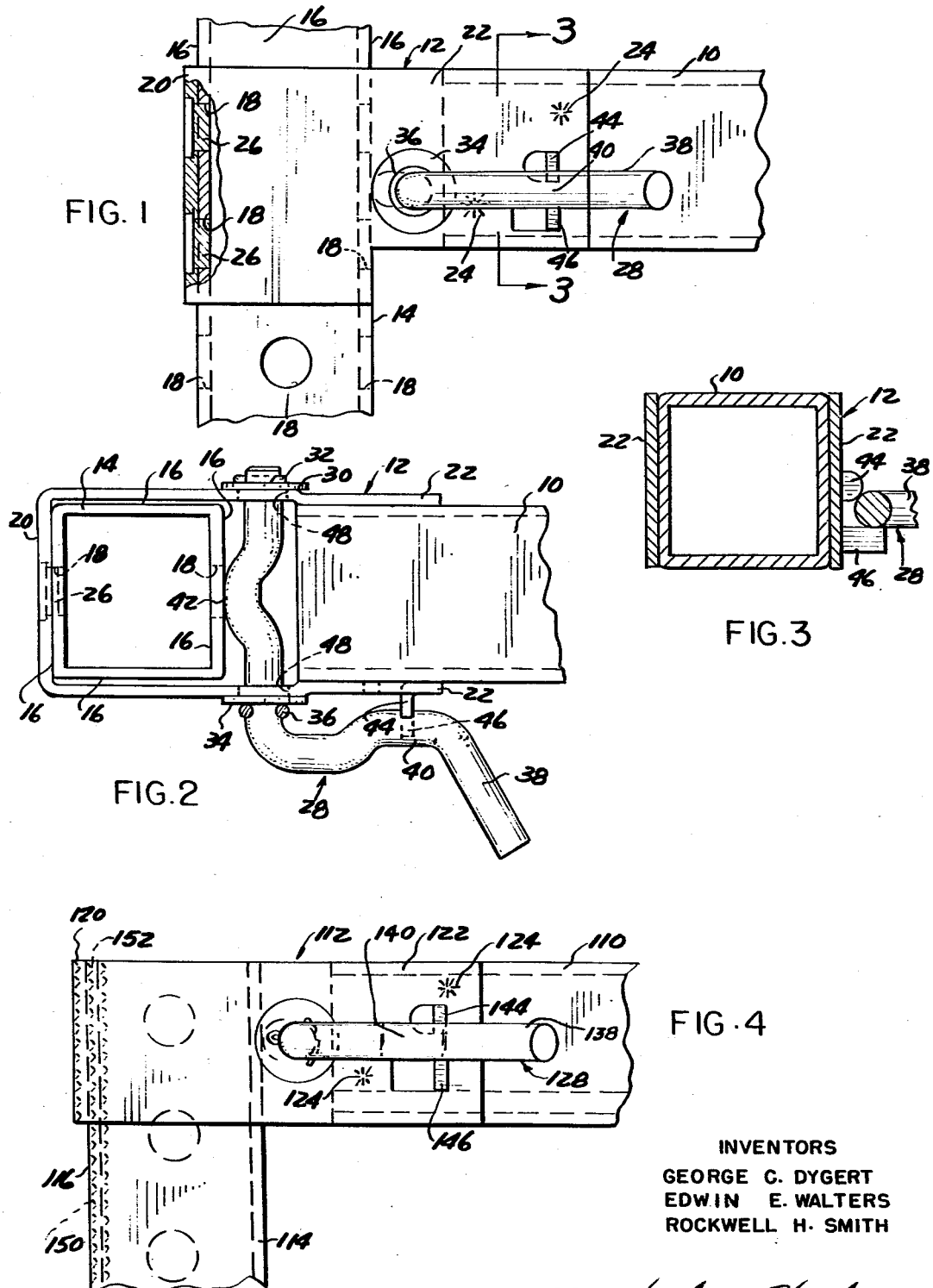
INVENTORS
GEORGE C. DYGERT
EDWIN E. WALTERS
ROCKWELL H. SMITH
BY 
ATTORNEYS Dec. 5, 1967    G. C. DYGERT ET AL    3,356,395
ADJUSTABLE CLAMP FITTING
Filed July 27, 1965    2 Sheets-Sheet 2
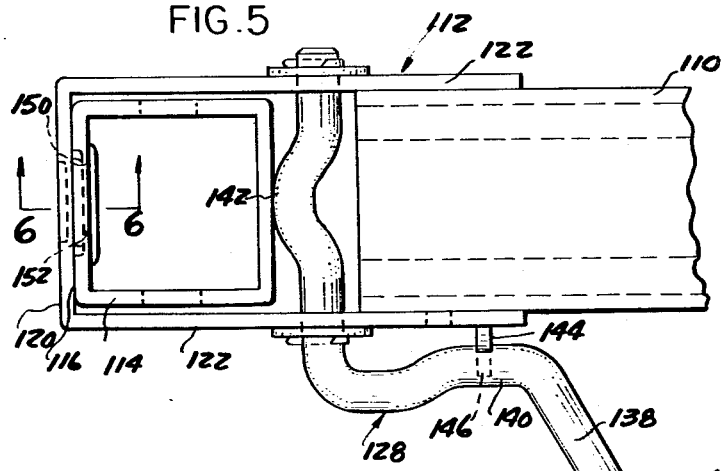
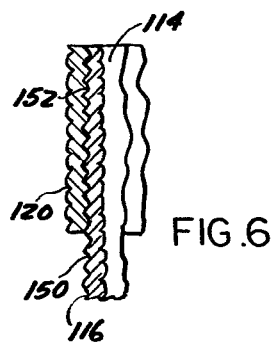
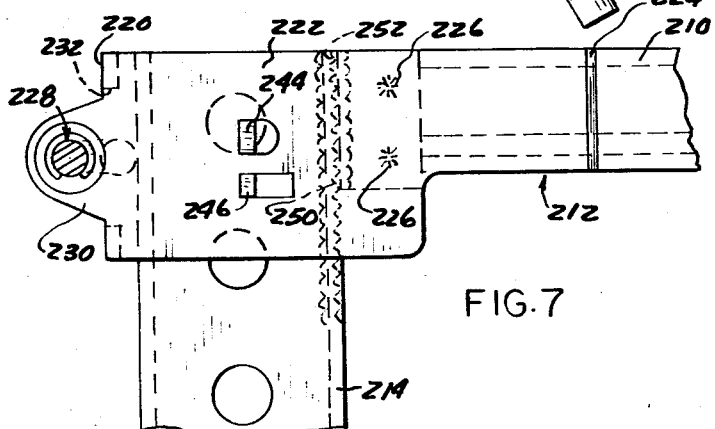
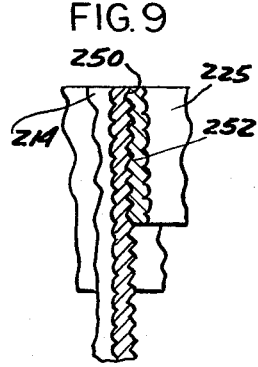
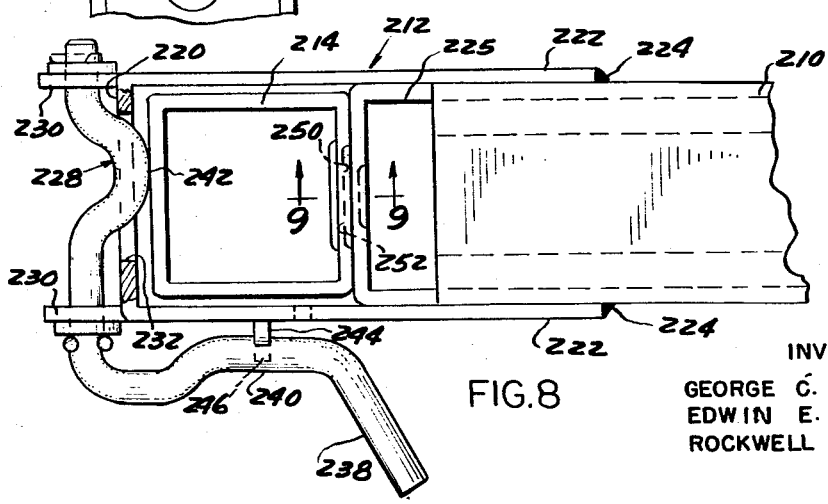
INVENTORS
GEORGE C. DYGERT
EDWIN E. WALTERS
ROCKWELL H. SMITH
BY *Hunke & Hauke*
ATTORNEYS United States Patent Office 3,356,395
Patented Dec. 5, 1967

3,356,395
ADJUSTABLE CLAMP FITTING
George C. Dygert, Livonia, Edwin E. Walters, Ann Arbor, and Rockwell H. Smith, Plymouth, Mich., assignors to Unistrut Corporation, Wayne, Mich., a corporation of Michigan
Filed July 27, 1965, Ser. No. 475,210
6 Claims. (Cl. 287—54.1)

ABSTRACT OF THE DISCLOSURE

A structural assembly including a horizontally disposed framing member, a vertically disposed framing member, a clamp carried by the horizontal member for adjustably clamping it along the vertical member, the clamp including a surface provided with friction increasing means and a bell crank member for selectively moving the surface into clamping engagement with a surface of the vertical member.

---

The present invention relates to fittings and more particularly to such a fitting for adjustably clamping one structural member to another.

In structural assemblies it is often desirable to adjustably mount one structural member to extend laterally from another structural member. An example of this can be found in storage racks or the like where to most efficiently utilize the available space it may be desired to provide a construction in which the shelf structure can be moved to several positions along vertical framing members.

The present invention provides a fitting adapted to be secured to a support member and to be clamped to a framing member. The fitting is provided with clamping means cooperating with means on the framing member to permit the support member to be moved along the framing member to any of several positions and to be securely locked in the selected position. The clamping means are relatively simple in construction and yet provide a secure supporting connection between the support member and the framing member. Means are incorporated for preventing accidental disengagement of the clamping means.

It is an object then of the present invention to provide a new adjustable structural assembly by providing a fitting adapted to be secured to a first structural member and having means cooperating with means provided on a second structural member to clamp the first structural member at any one of several positions along the second structural member.

It is another object of the present invention to provide an improved means of constructing storage racks or the like by providing a fitting having means for adjustably clamping a support for a shelf structure or the like at any one of several positions along a framing member.

It is still another object of the present invention to improve fittings for adjustable clamping to a structural member by providing such a fitting having means operable upon being moved into engagement with cooperating means provided on the structural member to clamp the fitting to the structural member and means for locking the clamping means in a clamped position.

Still further objects and advantages of the present invention will readily occur to one skilled in the art to which the invention pertains upon reference to the following drawings in which like reference characters refer to like parts throughout the several views and in which FIG. 1 is an elevational side view of a structural assembly utilizing one preferred fitting of the present invention.

FIG. 2 is a top elevational view of the embodiment illustrated in FIG. 1.

FIG. 3 is a cross-sectional view taken substantially on line 3—3 of FIG. 1.

FIG. 4 is an elevational side view of a structural assembly utilizing another preferred fitting of the present invention.

FIG. 5 is a top elevational view of the structural assembly illustrated in FIG. 4.

FIG. 6 is a cross-sectional view taken substantially on line 6—6 of FIG. 5.

FIG. 7 is an elevational side view of a structural assembly utilizing still another preferred fitting of the present invention.

FIG. 8 is a top elevational view of the structural assembly illustrated in FIG. 7, and FIG. 9 is a cross-sectional view taken substantially at line 9—9 of FIG. 8 and enlarged somewhat for purposes of clarity.

Now referring to the drawings for a more detailed description of the present invention FIGS. 1–3 illustrate a structural assembly utilizing one preferred fitting of the present invention as comprising an elongated structural member 10, a fitting 12, and an elongated tubular framing member 14. The framing member 14 is preferably square in lateral cross-section and is provided on its faces 16 with a plurality of equally spaced centrally disposed perforations 18.

The fitting 12 is substantially U-shaped in elevation as can best be seen in FIG. 2 to provide a base portion 20 and a pair of parallel extending arms 22. The free ends of the arms 22 are bent inwardly slightly and then parallel again to engage the opposite sides of the structural member 10. The structural member 10 extends from the fitting 12 and is secured thereto preferably by welding shown at 24 in FIG. 1.

The framing member 14 is carried within the fitting 12 in the space defined by the inner surfaces of the base portion 20 and the arms 22 and the end of the structural member 10 and extend substantially normal with respect to the longitudinal axis of the structural member 10. The base portion 20 of the fitting 12 is provided with inwardly displaced portions 26 which are dimensioned and spaced to extend into adjacent perforations 18 of the framing member 14 when the fitting 12 and the framing member 14 are relatively moved to a position in which the portions 26 and adjacent perforations 18 are in alignment.

The arms 22 carry a bell crank 28 which extends through the arms 22 intermediate the framing member 14 and the end of the structural member 10. One end of the bell crank 28 extends through one of the arms 22 and is preferably retained in position by a washer 30 and a cotter pin 32. The other end of the bell crank 28 extends through the opposite arm 22 and is preferably retained in position by a washer 34 and a snap ring 36 carried by the bell crank 28 so that the bell crank 28 is rotatably mounted intermediate the arms 22. A handle 38 is provided on the bell crank 28 and the handle 38 is provided with a straight portion 40 extending parallel to and closely adjacent to the exterior surface of one of the arms 22. The bell crank 28 is provided with a medial cam portion 42 which is adapted to engage the exterior surface of the framing member 14 and urge the framing member 14 and the base portion 20 of the fitting 12 into engagement upon rotation of the bell crank 28 so that when the inwardly displaced portions 26 are aligned with adjacent perforations 18 provided in the framing member 14 rotation of the bell crank 28 will urge the members into a position in which the portions 26 are in a seated and locking position within adjacent perforations 18. The bell crank 28 is preferably positioned in the arms 22 so that when the perforations 18 are aligned with the displaced portions 26 the medial cam portion 42 bears against the surface of the framing member 14 intermediate a pair of adjacent perforations 18.

To lock the bell crank 28 in a clamping position portions 44 and 46 are struck outwardly from the arm 22 adjacent the straight portion 40 of the handle 38. The portion 46 is longer than the portion 44 and provides a stop which engages with the straight portion 40 to limit rotational movement of the handle 38 and thus the bell crank 28. The portion 44 is somewhat shorter than the portion 46 and is arcuately formed on its end. This in combination with the slightly enlarged holes 48 which are provided in the arms 22 to carry the bell crank 28 permit the bell crank 28 to be rocked slightly to permit the straight portion 40 to be brought over the portion 44 and to thereby be locked intermediate the portions 44 and 46 to lock the fitting in a clamping position.

When it is desired to adjust the structural member 10 to a new axial position on the framing member 14, the handle 38 is moved outwardly slightly and then rotated past the portion 44 to move the cam portion 42 of the bell crank 28 away from the framing member 14. This permits the framing member 14 and the fitting 12 to be relatively moved to move the portions 26 from the perforations 18. In this unlocked position the fitting 12 and the structural member 10 can be moved to a new axial position along the framing member 14 and can be locked in any one of a number of possible adjusted positions by again aligning the portions 26 with a pair of adjacent perforations 18 and rotating the bell crank 28 to the locking position in which the straight portion 40 is positioned intermediate the portions 44 and 46.

FIGS. 4–6 illustrate a structural assembly utilizing another preferred fitting of the present invention. A fitting 112 similar in construction to the fitting 12 described above is substantially U-shaped in elevation to provide a base portion 120 and a pair of parallel extending arms 122. A structural member 110 is disposed with its end portion intermediate the arms 122 of the fitting 112 and is secured in position preferably by welding as shown at 124 in FIG. 4. A framing member 114 is carried within the fitting 112 in the space defined by the inner surfaces of the base portion 120 and the arms 122 and the end of the structural member 110 and extends substantially normal with respect to the longitudinal axis of the structural member 110 all as described above.

The arms 122 carry a bell crank 128 intermediate the framing member 114 and the end of the structural member 110 provided with a medial cam portion 142, a handle 138 and a straight portion 140 substantially as described above with respect to the belt crank 28. The arm 122 adjacent the straight portion 140 is provided with outwardly struck portions 144 and 146 to lock the bell crank 128 in a rotated clamping position as described above with respect to FIGS. 1–3.

To provide a clamping engagement between the framing member 114 and the base portion 120 of the fitting 112 upon rotation of the bell crank 128, the framing member 114 is provided with a face 116 which is adapted to be positioned adjacent the inner surface of the base portion 120 of the fitting 112. The face 116 is provided with a plurality of medially disposed laterally extending serrations 150 as can best be seen in FIG. 6. The inner surface of the base portion 120 is provided with a plurality of serrations 152 which engage with the serrations 150 provided in the framing member 114 and thereby lock the fitting 112 to the framing member 114.

It is apparent that providing the serrations 150 and 152 to form the clamping function between the fitting 112 and the framing member 114 the number of axial positions at which the fitting 112 can be locked with respect to the framing member 114 is substantially increased over the embodiment illustrated in FIGS. 1–3. Other than this the fitting 112 functions substantially similar to that of fitting 12 of FIGS. 1–3.

FIGS. 7–9 illustrate a structural assembly utilizing still another preferred fitting 212 of the present invention. The fitting 212 is substantially U-shaped in elevation to provide a base portion 220 and a pair of parallel extending arms 222. A structural member 210 extends from the fitting 212 and is secured thereto preferably by welding 224 provided at the free edges of the arms 222. A substantially U-shaped member 225 is carried intermediate the arms 222 and is preferably secured thereto by welding as indicated at 226 of FIG. 7.

A framing member 214 is carried within the fitting 212 in the space defined by the inner surfaces of the base portion 220, the arms 222, and the U-shaped member 225 and extends substantially normal with respect to the longitudinal axis of the structural member 210. The base portion 220 of the fitting 212 is provided with outwardly bent portions which define a pair of parallel lugs 230 and a lateral slot 232. The lugs 230 provide the means for rotatably carrying a bell crank 228 having a medial cam portion 242 adapted to extend through the slot 232 and to engage the surface of the framing member 214 so that rotation of the handle 238 produces relative movement of the framing member 214 toward the U-shaped member 225.

Outwardly struck portions 244 and 246 are provided on the arm 222 adjacent a straight portion 240 of the handle 238 to provide means for locking the bell crank 228 in rotated position substantially as described above with respect to FIGS. 1–3 and FIGS. 4–6.

The surface of the framing member 214 adjacent the U-shaped member 225 is provided with a plurality of medially disposed laterally extending serrations 250 and the adjacent surface of the U-shaped member 225 is provided with a plurality of similarly positioned serrations 252 so that movement of the framing member 214 relatively toward the U-shaped member 225 produces a clamping engagement between the serrations 250 and 252 to securely lock the fitting 212 and thus the structural member 210 to the framing member 214.

It is apparent that fittings have been described which can be used to lock a support member to a framing member in a number of different axial positions. Such a fitting finds use in a number of structural assemblies but is especially useful in storage racks or the like where it is desired to have means for adjusting the size of the individual storage areas to permit the most efficient use to be made of the total available storage area.

While the particular structural assemblies described herein provides a secure engagement between the framing members and the support member, it also provides means in which adjustment can be easily accomplished and in which accidental disengagement of the members is substantially diminished. The means of locking the bell crank in the clamping position diminishes the chance of the bell crank being accidentally moved from the locked clamping position. The particular means disclosed is simple in construction and therefore adds little to the cost of the fitting so that the assembly is relatively economical to manufacture.

It is also apparent that although it has been preferred to describe the assemblies of the present invention as comprising a construction in which the framing members are fixed and the bell crank is operable to move the fitting into clamping engagement with the framing members, if it is preferred the support members and the fittings could be carried in a fixed position and in such an assembly the bell cranks would move the framing members into locking engagement with the fitting.

It is also apparent that although we have described several embodiments of our invention, many changes and modifications can be made therein without departing from the spirit of the invention as expressed by the appended claims.

We claim:
1. In a structural assembly, means for adjustably clamp- ing a first structural member to a second structural member, said means comprising
(a) a fitting carried by said first structural member and embracing said second structural member,
(b) means carried by said fitting for producing a locking engagement between said fitting and said second structural member upon relative movement of said second structural member and said fitting in one direction,
(c) means carried by said fitting for producing relative movement of said second structural member and said fitting in the direction producing locking engagement,
(d) said last mentioned means comprising a bell crank rotatably carried by said fitting and having a cam portion engaging said second structural member to produce relative movement of said fitting and said second structural member, and
(e) said locking engagement producing means comprising said second structural member being provided with a face having a plurality of spaced perforations and said fitting having a face having at least one projection adapted to be received by any selected one of said perforations upon alignment of said projection with a selected one of said perforations.

2. The assembly as defined in claim 1 and including means for locking said bell crank in a rotated position in which said fitting and said second structural member are in locking engagement.

3. In a structural assembly, means for adjustably clamping a first structural member to a second structural member, said means comprising
(a) a fitting carried by said first structural member and embracing said second structural member,
(b) means carried by said fitting for producing a locking engagement between said fitting and said second structural member upon relative movement of said second structural member and said fitting in one direction,
(c) means carried by said fitting for producing relative movement of said second structural member and said fitting in the direction producing locking engagement,
(d) said last mentioned means comprising a bell crank rotatably carried by said fitting and having a cam portion engaging said second structural member to produce relative movement of said fitting and said second structural member, and said locking engagement producing means comprising said second structural member being provided with a face having a plurality of spaced serrations, and said fitting having a face having a plurality of serrations adapted to be received by at least some of said structural member serrations upon relative movement of said fitting and said second structural member to bring said faces one toward the other.

4. The assembly as defined in claim 3 and including means for locking said bell crank in rotated position in which said fitting and said second structural member are in locking engagement.

5. In a structural assembly means for adjustably clamping a first structural member to a second structural member, said means comprising,
(a) a fitting carried by said first structural member and embracing said second structural member,
(b) means carried by said fitting for producing a locking engagement between said fitting and said second structural member upon relative movement of said second structural member and said fitting in one direction,
(c) means carried by said fitting for producing relative movement of said second structural member and said fitting in the direction producing said locking engagement,
(d) means for locking said fitting and said second structural member in said locking engagement, and
(e) said locking engagement means comprising said second structural member being provided with a face having a plurality of spaced perforations and said fitting having a face having at least one projection adapted to be received by any selected one of said perforations upon relative movement of said fitting and said second structural member to bring said faces one toward the other.

6. In a structural assembly, means for adjustably clamping a first structural member to a second structural member, said means comprising
(a) a fitting carried by said first structural member and embracing said second structural member,
(b) means carried by said fitting for producing a locking engagement between said fitting and said second structural member upon relative movement of said second structural member and said fitting in one direction,
(c) means carried by said fitting for producing relative movement of said second structural member and said fitting in the direction producing said locking engagement,
(d) means for locking said fitting and said second structural member in said locking engagement, and
(e) said locking engagement means comprising said second structural member being provided with a face having a plurality of spaced serrations and said fitting having a face having a plurality of serrations adapted to be received by some of the serrations provided on said second structural member upon relative movement of said fitting and said second structural member to bring said faces one toward the other.

References Cited

UNITED STATES PATENTS

| | | | |
|---|---|---|---|
| 88,803 | 4/1869 | Page and Miller | 272—70.2 |
| 162,590 | 4/1875 | Van Horn and Wideman | 287—20.927 |
| 2,185,948 | 1/1940 | Pimm | 287—54.1 |
| 2,567,840 | 9/1951 | Buck | 287—54.1 |
| 2,969,859 | 1/1961 | Huggins | 287—189.36 |
| 3,134,474 | 5/1964 | Marchman | 248—245 |

CARL W. TOMLIN, *Primary Examiner.*

W. L. SHEDD, *Assistant Examiner.*